(12) United States Patent
Lin

(10) Patent No.: US 7,007,284 B2
(45) Date of Patent: Feb. 28, 2006

(54) ANTI-SHOCK TRAVERSE STRUCTURE

(75) Inventor: Hung-Jui Lin, Taipei (TW)

(73) Assignee: EPO Science & Technology, Inc., Taipei (TW)

( * ) Notice: Subject to any disclaimer, the term of this patent is extended or adjusted under 35 U.S.C. 154(b) by 0 days.

(21) Appl. No.: 10/354,035

(22) Filed: Jan. 30, 2003

(65) Prior Publication Data

US 2004/0154030 A1    Aug. 5, 2004

(51) Int. Cl.
*G11B 17/03*    (2006.01)
*G11B 17/04*    (2006.01)

(52) U.S. Cl. ...................... 720/611; 720/613

(58) Field of Classification Search ................ 720/601, 720/605, 611, 613
See application file for complete search history.

(56) References Cited

U.S. PATENT DOCUMENTS

| | | | |
|---|---|---|---|
| 2002/0110072 A1 * | 8/2002 | Yanagiguchi | 369/75.2 |
| 2003/0117928 A1 * | 6/2003 | Choi et al. | 369/75.2 |
| 2003/0152011 A1 * | 8/2003 | Yeh | 369/75.2 |

FOREIGN PATENT DOCUMENTS

| | | | | |
|---|---|---|---|---|
| JP | 07254263 A | * | 10/1995 | |
| JP | 10106231 A | * | 4/1998 | |
| JP | 10199085 A | * | 7/1998 | |
| JP | 2000187916 A | * | 7/2000 | |
| JP | 2000231779 A | * | 8/2000 | |
| JP | 2001110118 A | * | 4/2001 | |
| JP | 2001167567 A | * | 6/2001 | |
| JP | 2001216703 A | * | 8/2001 | |
| JP | 2001222849 A | * | 8/2001 | |

* cited by examiner

*Primary Examiner*—William J Klimowicz
(74) *Attorney, Agent, or Firm*—Troxell Law Office, PLLC

(57) ABSTRACT

An anti-shock traverse structure includes a movable frame attached to a traverse. The movable frame has elastic plates extending therefrom. The elastic plates have respective upwardly bent sections to resiliently bias against a lower side of a tray.

3 Claims, 4 Drawing Sheets

ANTI-SHOCK TRAVERSE STRUCTURE

BACKGROUND OF THE INVENTION

1. Field of the Invention

The present invention relates to a loader for a disk, more specifically, to an anti-shock structure of a traverse in a loader.

2. Description of Related Art

Referring to FIG. 1, a conventional loader for a disk includes a base 10, a traverse 20 and a tray 30. The base 10 has a transmission device such as the one Publication No. 420349 in the Taiwanese Official Patent gazette. The transmission device disclosed in the Publish No. 420349 can actuate the traverse 20 having a turntable 21 at an end thereof to move the turntable up and down so as to selectively enter and leave a disk being driven and to drive the tray 30 between an interior and exterior of the loader. The traverse 20 further has an optical pickup 22 to read the data saved on the disk or write data onto the disk. The traverse 20 is attached to a movable frame 23 and both sides of the movable frame 23 are pivotally connected with the base 10. The traverse 20 includes a side plate 231 on a lateral side thereof. The side plate 231 has two posts inserted into a guide rail of the transmission device so that the side plate 231 can be moved up and down with the guide rail and the movable frame 23 with the traverse 20 at the end having the turntable 21 can also move up and down. The tray 30 provides a hole 31 corresponding to the moving area of the turntable 21 and the optical pickup 22.

Referring to FIGS. 1–3, the movable frame 23 at an upper end of the side plate 231 has two upwardly projecting fixing plates 232 and the side plate 231 is actuated by the transmission device to move toward the tray 30 so as to allow the turntable 21 to pass over the hole 31 of the tray 30 and rotate the disk when the tray 30 moves into the loader and is placed over the base 10. At the right time, the side plate 231 at the two fixing plates 232 biases against the two shock absorption pads 32 at the lower side of the tray 30 so that the two shock absorption pads 32 can absorb the energy generated by the traverse 20 swaying up and down when the turntable 21 rotates the disk to reduce the up and down swaying of the traverse 20. Further, the two shock absorption pads 32 are adhered to the lower side of the tray 30 contacting with upper ends of the fixing plates 231 to prevent the fixing plates 232 from touching the bottom of the try 30 directly and generating a noise.

The preceding anti-shock structure formed with the two fixing plates 232 and the two shock absorption pads 32 takes a lot of time because the two shock absorption pads made of foam material have to be adhered to the bottom of the tray 30 and the foam material itself provides less elasticity with an unfavorable effect of shock absorption so that it is easy to lose the property of shock absorption when more time is taken to reduce the swaying of the traverse and the resulting noise.

SUMMARY OF THE INVENTION

The objective of the present invention is to overcome the deficiencies of the prior art, such as reducing the time for fabrication and improving an anti-shock effect.

Therefore, a primary object of the present invention is to provide an anti-shock traverse structure, which is easily made and provides a better anti-shock effect.

BRIEF DESCRIPTION OF THE DRAWINGS

The present invention can be more fully understood by reference to the following description and accompanying drawing, in which.

DETAILED DESCRIPTION OF THE PREFERRED EMBODIMENT

Figure 4:
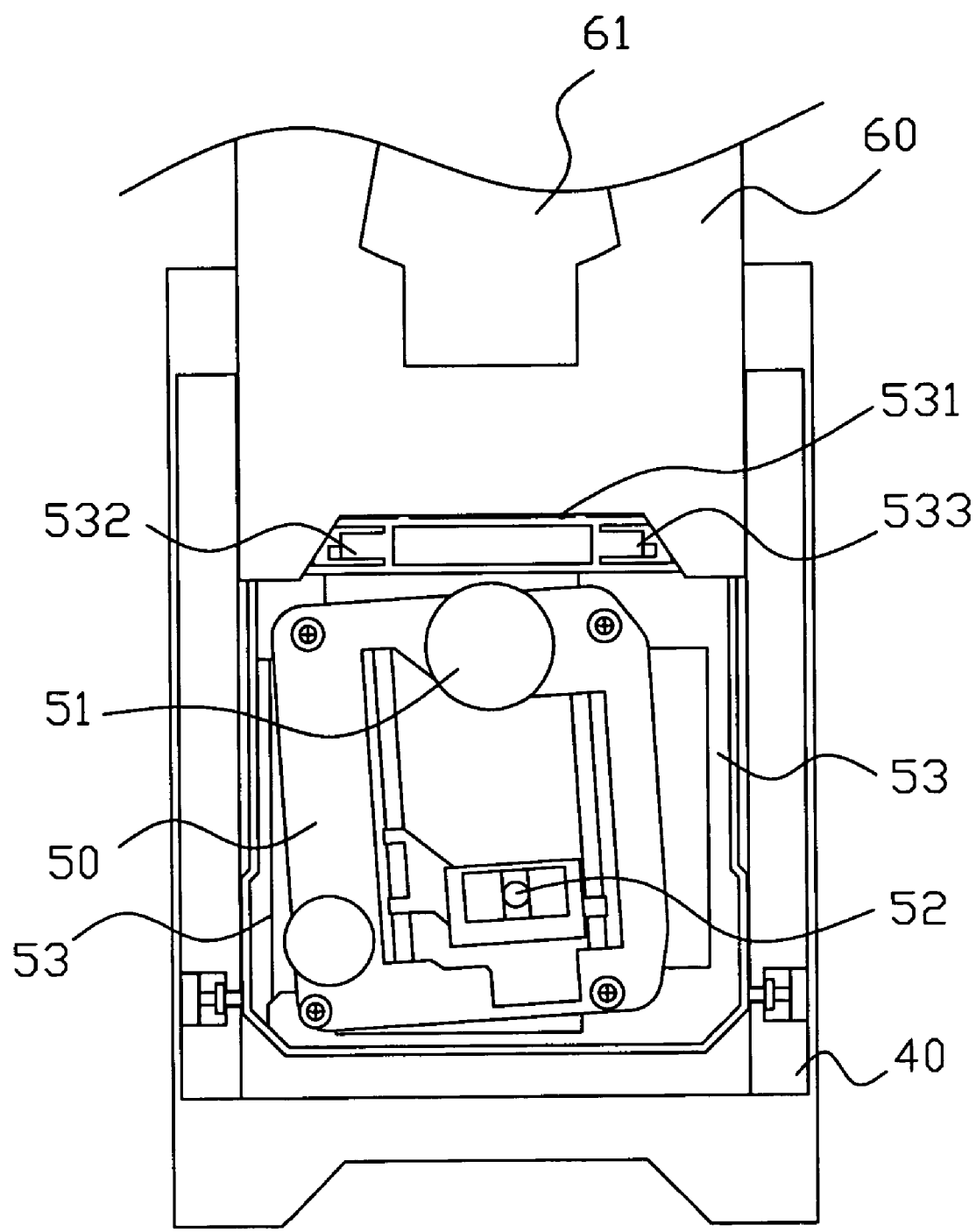
FIG. 4 is a plan view of a loader with anti-shock structure according to the present invention.

Referring to FIG. 4, a loader with an anti-shock structure according to the present invention includes a base 40, a traverse 50 and a tray 60. The traverse 50 has a turntable 51, an optical pickup 52, and a movable frame 53 connected to the traverse 50. The movable frame 53 at two lateral sides thereof is pivotally connected to the base 40 and a side plate 531 thereof has a lateral side extending and fitting with two posts in a guide rail of a transmission device. The transmission device can move the movable frame 53 and an end of the traverse 50 located on a side of the turntable side 51 up and down.

Figure 1:
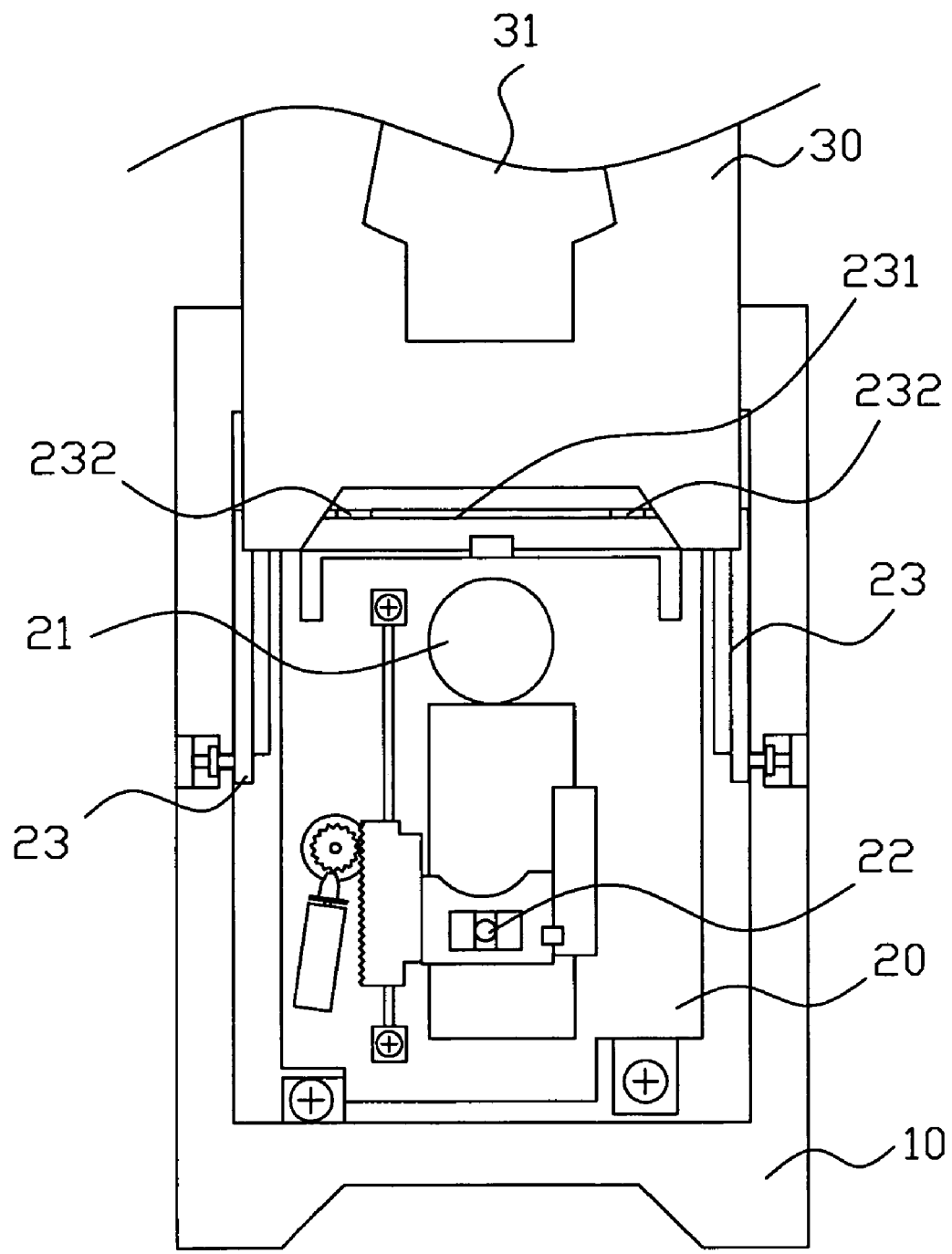
FIG. 1 is a plan view of a conventional loader.
Figure 2:
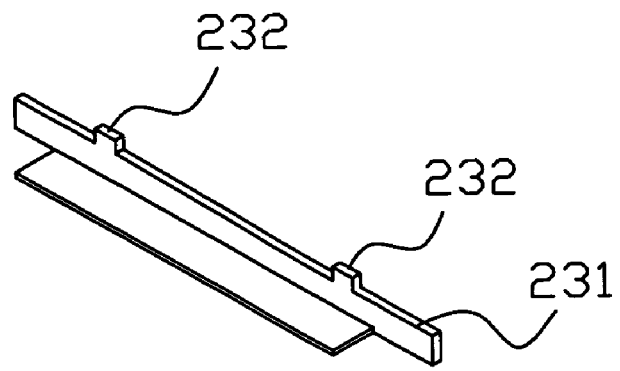
FIG. 2 is a perspective view of a lateral plate of a conventional movable frame.
Figure 3:
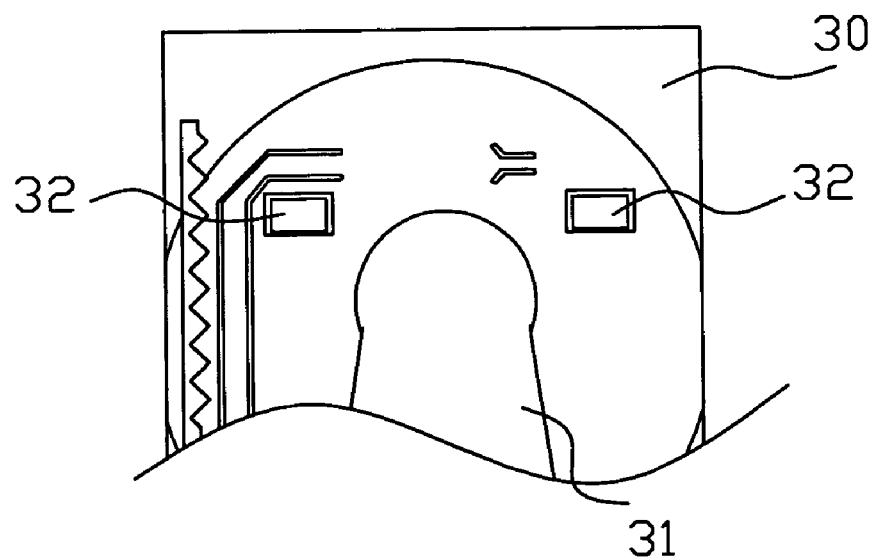
FIG. 3 is a fragmentary plan view of a conventional tray illustrating the lower side thereof.
Figure 5:
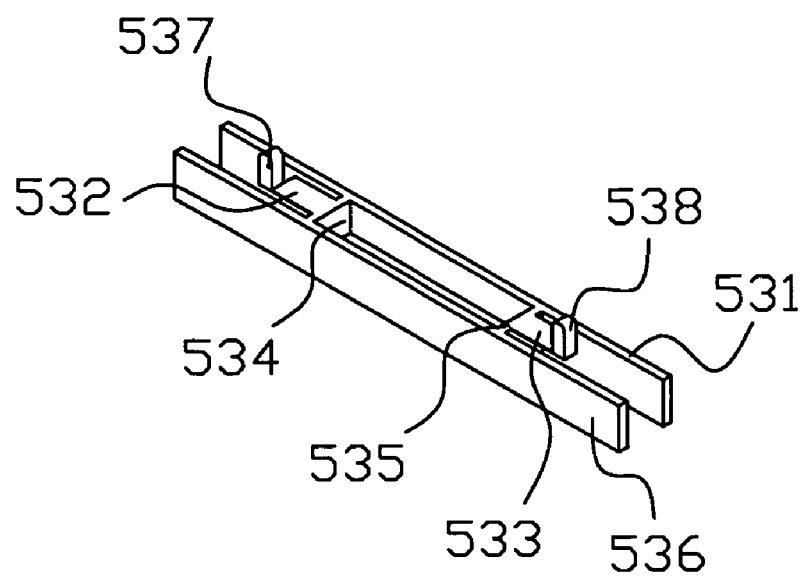
FIG. 5 is a perspective view of the lateral plate of a movable frame according to the present invention.
Figure 6:
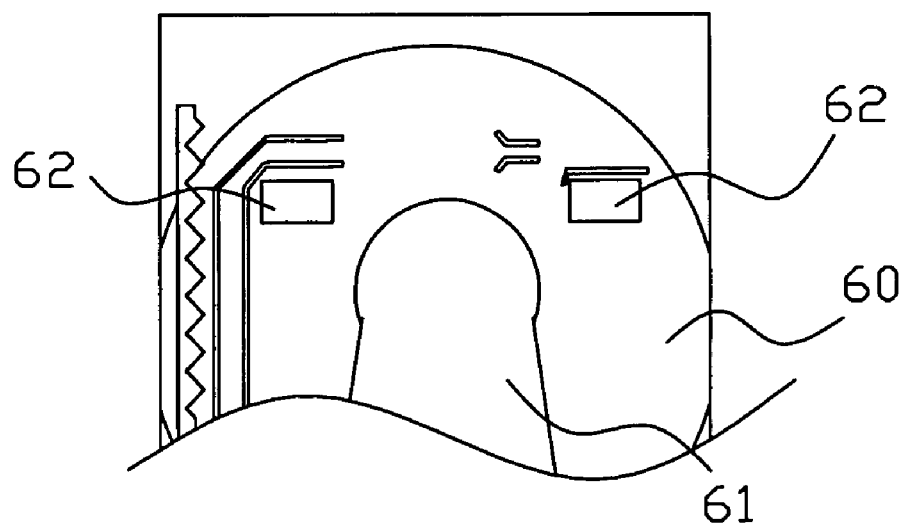
FIG. 6 is a fragmentary plan view of a tray according to the present invention illustrating the lower side thereof.

Referring to FIGS. 4–6, the anti-shock structure of the traverse according to the present invention is different from the conventional one shown in FIG. 1 in that the movable frame 53 of the present invention has a side plate 531 having two elastic plates 532, 533 extending therefrom. The side plate 531 at the inner side thereof has two joining plates 534, 535 extending therefrom and each of the joining plates 534, 535 at another end thereof is attached to another side plate 536. Each of the joining plates 534, 535 at a lower end thereof is connected to another joining plate. Each of the two elastic plates 532, 533 at the lower end thereof extends outward the two joining plates 534, 535 longitudinally with a up bent section 537, 538 respectively. Each of the upwardly bent sections 537, 538 biases against a corresponding pressed spot 62 respectively at the bottom of the tray 60.

The two elastic plates 532, 533 and the movable frame 53 are integrally made of a plastic material, instead of two shock absorptions being adhered to the tray at the bottom thereof in the conventional anti-shock structure, so that it is easily made. Further, the two elastic plates 532, 533 have an upwardly bent section respectively with stronger elasticity so that a better effect of shock absorption can be obtained with a sound durability. Therefore, the present invention substantially overcomes the deficiencies of the conventional anti-shock structure of the traverse on the loader.

While the invention has been described with reference to the preferred embodiments thereof, it is to be understood that modifications or variations may be easily made without departing from the spirit of this invention, which is defined by the appended claims.

What is claimed is:

1. An anti-shock traverse structure, comprising:
   a traverse;
   a tray being moved by the traverse; and
   a movable frame being attached to the traverse;
   wherein the movable frame has at least an elastic plate extending therefrom and the elastic plate having an upwardly bent section resiliently biasing against a lower side of the tray,
   wherein the movable frame has a first side plate located on a side thereof and the elastic plate extends outwardly from the first side plate,
   wherein the first side plate has two elastic plates,
   wherein the first side plate at an inner side thereof has two joining plates and each of the two elastic plates extend outwardly from a bottom of the two joining plates.

2. The anti-shock traverse structure according to claim 1, wherein each of two joining plates are attached to a second side plate at an end opposite the first side plate.

3. The anti-shock traverse structure according to claim 2, wherein the two joining plates connect with a third joining plate.

* * * * *